United States Patent
Monden

(10) Patent No.: US 8,656,668 B2
(45) Date of Patent: Feb. 25, 2014

(54) MODULAR FRAME FOR FASTENING A CONDUIT AT A CONSTRUCTION PART

(75) Inventor: Thomas Monden, Stetten (DE)

(73) Assignee: Hilti Aktiengesellschaft, Schaan (LI)

(*) Notice: Subject to any disclaimer, the term of this patent is extended or adjusted under 35 U.S.C. 154(b) by 0 days.

(21) Appl. No.: 13/538,413

(22) Filed: Jun. 29, 2012

(65) Prior Publication Data

US 2013/0152497 A1 Jun. 20, 2013

(30) Foreign Application Priority Data

Dec. 14, 2011 (DE) .................. 10 2011 088 487

(51) Int. Cl.
*E04C 2/00* (2006.01)

(52) U.S. Cl.
USPC ........................................ 52/232

(58) Field of Classification Search
USPC .......... 52/232, 220.8, 220.1, 220.3; 174/68.1, 174/64
See application file for complete search history.

(56) References Cited

U.S. PATENT DOCUMENTS

| | | | | |
|---|---|---|---|---|
| 2,813,692 A * | 11/1957 | Peterson et al. | ................. | 248/56 |
| 4,817,348 A * | 4/1989 | Wydra | .......................... | 52/220.8 |
| 4,889,298 A | 12/1989 | Hauff | | |
| 5,406,032 A * | 4/1995 | Clayton et al. | ................. | 174/151 |
| 5,456,050 A * | 10/1995 | Ward | .......................... | 52/220.8 |
| 5,594,202 A * | 1/1997 | Tobias | .......................... | 174/505 |
| 5,783,776 A * | 7/1998 | Birmingham et al. | ........ | 174/657 |
| 5,939,676 A * | 8/1999 | Birmingham et al. | ........ | 174/656 |
| 6,357,188 B1 * | 3/2002 | Lee et al. | ..................... | 52/220.8 |
| 6,809,129 B2 * | 10/2004 | Abu-Isa | ........................ | 523/179 |
| D502,147 S | 2/2005 | Stahl, Sr. | | |
| 7,288,730 B2 * | 10/2007 | Habel et al. | ................... | 174/650 |
| 7,427,050 B2 * | 9/2008 | Stahl et al. | ....................... | 248/56 |
| 7,465,888 B2 * | 12/2008 | Fischer et al. | ................ | 174/655 |
| 7,877,941 B2 * | 2/2011 | Fischer et al. | ............... | 52/220.8 |
| 7,878,463 B2 * | 2/2011 | Kauppila | ......................... | 248/65 |
| 8,069,623 B2 * | 12/2011 | Colwell et al. | ............... | 52/220.8 |
| 8,161,696 B2 * | 4/2012 | Colwell et al. | ............... | 52/220.8 |
| 8,188,382 B2 * | 5/2012 | Monden et al. | ............... | 174/505 |
| 2004/0016190 A1 | 1/2004 | Radke et al. | | |
| 2004/0016193 A1 | 1/2004 | Stahl, Sr. | | |
| 2006/0138251 A1 | 6/2006 | Stahl, Sr. | | |
| 2007/0125018 A1 | 6/2007 | Stahl, Sr. | | |
| 2007/0175125 A1 | 8/2007 | Stahl, Sr. et al. | | |
| 2007/0277457 A1 * | 12/2007 | Langston et al. | ............ | 52/220.8 |
| 2011/0041432 A1 * | 2/2011 | Colwell et al. | ............... | 52/220.8 |

FOREIGN PATENT DOCUMENTS

DE 3727160 C1 9/1988
DE 102006035475 6/2008

OTHER PUBLICATIONS

DE Patent Office Communication, dated Oct. 26, 2012 in Application No. DE102011088487.4 (6 pages).

* cited by examiner

*Primary Examiner* — Mark Wendell
(74) *Attorney, Agent, or Firm* — McAndrews, Held & Malloy, Ltd.

(57) ABSTRACT

A modular frame is described for the assembly of at least one conduit at a construction part. The modular frame comprises a base plate that may be fastened at the construction part, several flange elements arranged side-by-side which may be fastened at the base plate, each comprising a sealing element, and a flat, plate-shaped intermediate element arranged between the base plate and the flange elements, which is characterized in the base plate, the intermediate element, and the flange element showing several passages to accept conduits adjusted to the diameters of said conduits.

15 Claims, 3 Drawing Sheets

1

MODULAR FRAME FOR FASTENING A CONDUIT AT A CONSTRUCTION PART

CROSS-REFERENCE TO RELATED APPLICATIONS

The present application claims priority to German Patent Application DE 10 2011 088 487.4, filed Dec. 14, 2011, and entitled "Modulrahman zur Befestigung einer Leitungsdurchfuhrung an einem Bauteil" ("Modular Frame For Fastening A Conduit At A Construction Part"), which is hereby incorporated by reference in its entirety.

BACKGROUND OF THE INVENTION

The present invention generally relates to a module frame for assembling at least one conduit to a construction part. More particularly, the present invention relates to a module frame with a base plate that may be fastened to the construction part, several flange elements that may be fastened at the base plate and arranged side-by-side, each comprising a sealing element, and a flat, plate-shaped intermediate element arranged between the base plate and the flange elements.

Conduits for guiding lines through a construction part are known for example from US 2004/0016190 A1 and DE 10 2006 035 475 A1. Such conduits are installed during the erection of a construction part, such as a wall or a ceiling, or subsequently installed. In particular, the conduits may be cast in concrete ceilings or walls or subsequently passages may be drilled or cut into the construction part. Preferably such conduits are equipped with a fire prevention function. Thus, fire prevention measures are given starting at the time of installation or molding in the construction part by the installation of the line through the conduit to the completion of the building. In such conduits their internal seal regarding gaseous media, e.g., smoke, is important.

In addition to the tubular conduits described US 20040016190 A1 and DE 10 2006 035 475 A1 such conduits are known showing a rectangular frame, such as shown in the design patent USD 502147 S1, and described in US 2004016193 AA, US 2006138251 AA and US 2007125018 AA. The conduits of prior art are usually inserted directly into the penetrations of the construction part.

Due to the increasing number of data processing devices in buildings, such as hospitals and offices, particularly in individual rooms, the need for lines for transmitting digital information is increasing. Modular conduits have been designed to minimize the space needed for passing the lines through the wall in order to reduce the need for penetrations to the extent possible. Due to the fact that the need for such communication lines that need to be passed through walls and ceilings is increasing, it is necessary to bundle the conduits and to install several of them in a row.

US 20070175125 A1 describes a modular assembly frame for conduits, allowing a flexible equipment of the assembly frame with conduits. The described frame system comprises two longitudinal angles and two lateral angles assembled according to the needs of the user.

In this system it is disadvantageous that it is suitable only for conduits with a rectangular frame geometry. Tubular conduits cannot be installed in the frame or only with considerable expense for the user in a fire and smoke-sealed fashion.

Further, in this system it is disadvantageous that in order to seal the opening between the passage in the construction part and the frame, between the conduit and the frame, as well as between adjacent conduits in frames equipped with several of them, sealing elements must be installed by the user. This renders the system of prior art to be impractical because the user has additional expenses for the installation and additionally the system becomes prone to malfunction, for example when the sealing elements are forgotten or assembled at the wrong position.

Another disadvantage of the system of prior art results from subsequent installation of additional conduits into the already installed and partially equipped frame. For this purpose, the entire frame must be disassembled with the already installed conduits, the passage in the construction part must be enlarged, and the entire system must be installed anew. Accordingly a high assembly expense develops.

BRIEF SUMMARY OF THE INVENTION

One or more embodiments of the present invention provide a modular frame for the assembly of at least one conduit at a construction part. The modular frame comprises a base plate that may be fastened at the construction part, several flange elements arranged side-by-side which may be fastened at the base plate, each comprising a sealing element, and a flat, plate-shaped intermediate element arranged between the base plate and the flange elements, which is characterized in the base plate, the intermediate element, and the flange element showing several passages to accept conduits adjusted to the diameters of said conduits.

BRIEF DESCRIPTION OF THE DRAWINGS

In the following, an exemplary embodiment of the invention is described in greater detail with reference to the attached drawings. In the figures.

DETAILED DESCRIPTION OF THE INVENTION

Figure 1:
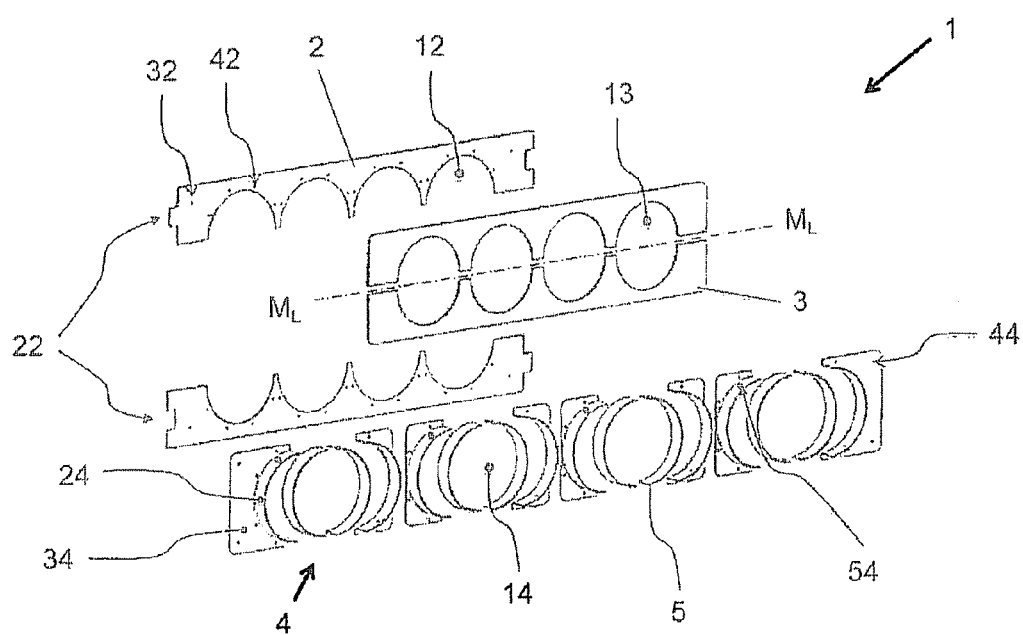
FIG. 1 shows an exploded illustration of an embodiment of a modular frame.

Therefore, there is the need for a solution allowing the installation of conduits, particularly tubular conduits, with as little expense as possible in a construction part, such as a wall or ceiling.

One embodiment of the invention comprises to provide a modular frame avoiding the above-mentioned disadvantages, particularly allowing a fast, simple, and secure installation of conduits in construction parts.

This is attained in a modular frame for the installation of at least one conduit in a construction part with a base plate that may be fastened at a construction part, several flange elements that may be fastened at the base plate and are arranged side-by-side, each showing a sealing element, and a flat, plate-shaped intermediate element arranged between the base plate and the flange elements, in which the base plate, the intermediate element, and the flange elements comprise several passages to accept conduits, adjusted to the circumference of the conduits.

Beneficially, the base plate is embodied rectangular and preferably shows a lateral length equivalent to the typical distance between two longitudinal carriers in dry-wall construction. Thus, the lateral lengths ranges from 14 to 18 inches and 22 to 26 inches. Based on the preferred dimensions of the modular frame it may be flexibly used and may also be fastened both at a massive wall, such as masonry, concrete, or the like, as well as a drywall component, with the drywall component further providing the option to fasten the modular frame onto said part prior to paneling with drywall on the construction frame or after paneling with drywall.

For this purpose, additional recesses are provided on the base plate in order to allow fastening the base plate to the construction part in a detachable fashion, such as oval or round holes for penetrating fastening structures, such as nails, screws, or the like.

The passages are preferably rounded; however, they are not restricted thereto. Other geometries, such as rectangles or squares, are also possible.

The size of the passages is here adjusted to the circumference of the conduits, so that appropriate modular frames are provided for common conduits. The passages are beneficially embodied such that their size slightly exceeds the size of the conduit, e.g., that a gap remains between the base plate and the conduit after its installation, in order to allow an easier installation and compensation in case of two modular frames, mounted at opposite sides of a drywall, were not fastened at precisely the same height. Additionally, any canting of the conduit at the base plate when inserted into the modular frame may be prevented, here. The gap shall preferably not be excessively large, though, because otherwise secure fixation of the conduit in the modular frame as well as fire and smoke gas sealing cannot be ensured any longer.

Preferably, the several passages are arranged evenly spaced along the long central line ($M_L$) of the rectangular base plate.

In a preferred embodiment the base plate is embodied in two parts in order to allow a simple subsequent assembly of the modular frame to an already installed conduit or to subsequently seal already laid lines or cables. The assembly of the two halves of the base plate on a construction part as well as the fastening of the flange elements to the base plate leads to a secure fastening of the two halves so that no additional structure are required for connecting the two halves, with it being an alternative that the base plate and/or the two halves are provided with such structures.

In a preferred embodiment the base plate is rectangular and divided into two parts along the central line dividing the short sides symmetrically, with the passages being divided in the middle and, for example in case of a round geometry, show the form of semicircles.

In one embodiment of the modular frame, the base plate further comprises an edge contour at least at two opposite outer edges, with the edge contour provided at the opposite outer edges preferably being embodied such that during the placement side-by-side of several devices the edge contours of two adjacent devices engage each other. The edge contour comprises, for example, a comb-like structure generated by square recesses, with the area of the recesses and the areas of the base plate which may engage the recesses of adjacent base plates being arranged alternatingly. Here, the edge contours of the opposite outer edges of the base plate behave like negatives and positives. Preferably, in a rectangular base plate the shorter sides are provided with an edge contour. Further preferred, the form of the edge contour is embodied such that the engaging elements generate no undercuts so that in the assembled state of, for example, two base plates they are not connected to each other in a fixed manner but a relative motion is possible, for example in order to compensate imprecise assembly and still creating a connection between two modular frames. This way, any movement of the construction part is compensated to a certain extent without subjecting the modular frame to excessive stress.

The material of the base plate is not limited, with the material beneficially being flexurally resistant, ensuring simple handling and assembly at the construction part. The base plate preferably comprises metal or a metal alloy, for example steel, or a suitable plastic.

Alternatively, the base plate may also represent a mineral-fiber plate or the like.

The base plate may further comprise elements for reinforcement.

The flange elements respectively comprise a passage to accept a sheath area forming a conduit and a planar flange area, with the sealing element being arranged in the sheath area. The sheath area is connected fixed to the flange area, for example by way of welding or adhesion, or embodied in one piece with it.

The sheath area is adjusted to the geometry of the conduit so that the appropriate modular frames are provided for common types of conduits. For the same reasons as for the recesses for the conduits of the base plate, the sheath area is embodied such that its size is slightly greater than the size of the conduits, e.g., that a gap remains between the sheath area and the conduit after its installation.

In order for the conduit to sit tightly in the modular frame in spite of the gap, the flange elements further comprise at least one structure for fixing the conduit. This structure may be formed, for example, by a screw or a pin, moved through recesses in the sheath area in the direction of the conduit, for example by a screwing motion, and may be fixed in an end position.

In order to seal the gap between the sheath area and the conduit in a smoke gas-tight fashion, a sealing element is provided in the sheath area at the side of the conduit. Preferably the sealing element comprises a material intumescent in case of fire. This way, not only the smoke gas sealing but also the fire sealing of the flange element is ensured. A sealing element made from a material sealing the gap from both smoke gas as well as being intumescent in case of fire is particularly advantageous. Alternatively, the sealing element may be embodied in several parts, so that a part thereof is intumescent in case of fire and is tight in reference to smoke gas, with it beneficially representing a part contacting the sheath area, and a part sealing the remaining gap between the intumescent material and the conduit from smoke gas. The sealing element is preferably embodied such or comprises a material so that the conduit may easily be inserted into the modular frame and the gap automatically is sealed, e.g., based on the material features of the sealing elements.

Advantageously, the sealing element is embodied as a tape or strip, with its width being equivalent to the height of the sheath area and its length equivalent to the inner perimeter of the sheath area so that the entire inner perimeter of the sheath area is covered by the sealing element. In case of the two-part flange element, the sealing element is particularly advantageously embodied such that the sealing elements of the two halves of the flange elements overlap. However, it is sufficient for the sealing effect against fire and smoke gas that the sealing elements abut.

The sealing element is preferably fastened fixed at the sheath area, for example by way of adhesion thereto such that the user is not responsible for the fastening. This prevents any faulty assembly and sealing elements being forgotten.

In one embodiment of the modular frame, the flange parts are embodied in two parts with preferably the sheath area and the flange area being divided along a central line of the flange area into two equal parts such that the sheath area forms two half-shells. For reasons of stability and depending on the application, in one or more embodiments it is not provided to separate the flange area from the sheath area in order to allow this way a two-part embodiment. In one or more embodiments, any subsequent sealing of lines or cables, or any retrofitting of the modular frame to already existing seals, is only possible without disassembling the conduit when the flange part is separated into two parts such that it may be placed around a conduit like a sleeve. Accordingly, the sealing element also comprises two parts. In other words, the sheath areas are provided with a sealing element at both flange elements.

The material of the flange element, similar to the material of the base plate, is not limited and beneficially flexurally rigid. The flange element preferably comprises a metal or a metal alloy, for example sheet metal or steel, or a suitable plastic. Alternatively the base plate may also be made from mineral fibers or the like.

In order to detachably fasten the base plate and the flange elements to each other, both of them comprise structures for this purpose. These structures may represent recesses (holes) through which the fastening structures, such as screws or rivets, may be guided. Alternatively, the structures at the base plate may represent a threaded pin and the structures at the flange element a recess, positioned at the flange area such that by placing the flange elements onto the base plate the threaded pin is guided through the recess. A fixed connection occurs then by a nut screwed onto the threaded pin. In another alternative, one structure may represent a threaded bore and the other one a recess.

In case of a two-part base plate and two-part flange elements, the flange elements are fastened to the base plate such that the two halves of the flange elements are mounted perpendicularly over the two halves of the base plate and the passage formed by the sheath area then rests on the passage of the base plate. This way, the two halves of the base plate as well as the two halves of the flange elements are fixed to each other.

The flange elements may be embodied such that the flange area only minimally projects beyond the sheath area in order to create a maximum number of passages. Here, the distance of the passages defined by the flange elements is preferably equivalent to the distance of the passages of the base plate and the intermediate elements. Alternatively, the flange area may also be embodied such that at least one half considerably projects beyond the sheath area so that the flange area serves as a cover for the open areas in the base plate when less flange elements are used than passages provided in the base plate. This provides a high degree of flexibility for the user. For the flange element, which is arranged between two additional flange elements, the shape of the flange area is preferably square.

According to one or more embodiments of the invention, the modular frame comprises an intermediate element, arranged between the base plate and the flange elements, and comprising recesses for passing a conduit.

The intermediate element serves as a thermal barrier, in order to separate the base plate thermally from the flange elements in case of fire and to prevent that the temperature is transferred from one element, for example the base plate, to another element, for example the flange area. Further, in a two-part embodiment of the base plate and the flange area, the intermediate element serves as the sealing element and the abutments between the individual elements seal in a smoke gas-tight fashion.

The intermediate element may be a separate element. Here, it is equivalent in its shape to the base plate and may be similarly embodied in two parts, with it being divided symmetrically along a central line dividing the short sides into two parts. Here, the passages form two semi-circular recesses. In this embodiment it comprises an area at least equivalent to the area formed by the flange elements and maximally equivalent to the area defined by the base plate.

Alternatively, the intermediate element may be a component of the flange elements, in which each flange element is provided with an intermediate element. Advantageously in this embodiment the intermediate element is equivalent in its shape and size to the flange area of the flange element. For this purpose, the intermediate element is connected fixed to the flange element, for example by way of adhesion.

In both embodiments the passages of the intermediate elements, or adjacently arranged intermediate elements, are equivalent in their size to the passages of the base plate and the passage of the flange elements.

In another embodiment, the passages of the intermediate elements are smaller than the passages of the base plate and the passages of the flange elements, which are of equal size. Here, by a suitable selection of the material of the intermediate element, additional smoke gas-sealing effects may be achieved, if necessary.

Beneficially, the intermediate element comprises a non-combustible, thermally insulating material, such as felt or a web, such as fiberglass web, and the like.

FIG. 1 shows an exploded illustration of a modular frame. The modular frame 1 comprises a two-part base plate 2, for example made from metal, a two-part intermediate element 3, for example made from felt, and four two-part flange elements 4, for example comprising metal.

The modular frame 2 is divided along the longer central line $M_L$ of the rectangle formed by the base plate into two equal parts and comprises four passages 12, arranged evenly side-by-side, in the form of half circles, which result in a circular recess when combining the two halves in an abutting fashion. Here, the distance of the two exterior recesses 12 is greater than the distance between the adjacent recesses 12 themselves. This way it is ensured that sufficient space is available, for example, to assemble the modular frame at support elements of drywalls (cf. FIG. 3) without the support hindering the installation of conduits (not shown in the illustration) or being hindered by the exterior recesses 12. Holes 32 are provided in order to assemble the base plate 2 and thus the modular frame 1 to a construction part. Further, holes 42 are provided, through which, for example, screws may be guided to fasten the flange elements 4, which also show holes 44 at the respective locations. The intermediate element 3 is fastened by applying the flange elements 4 at the base plate 2.

Figure 3:
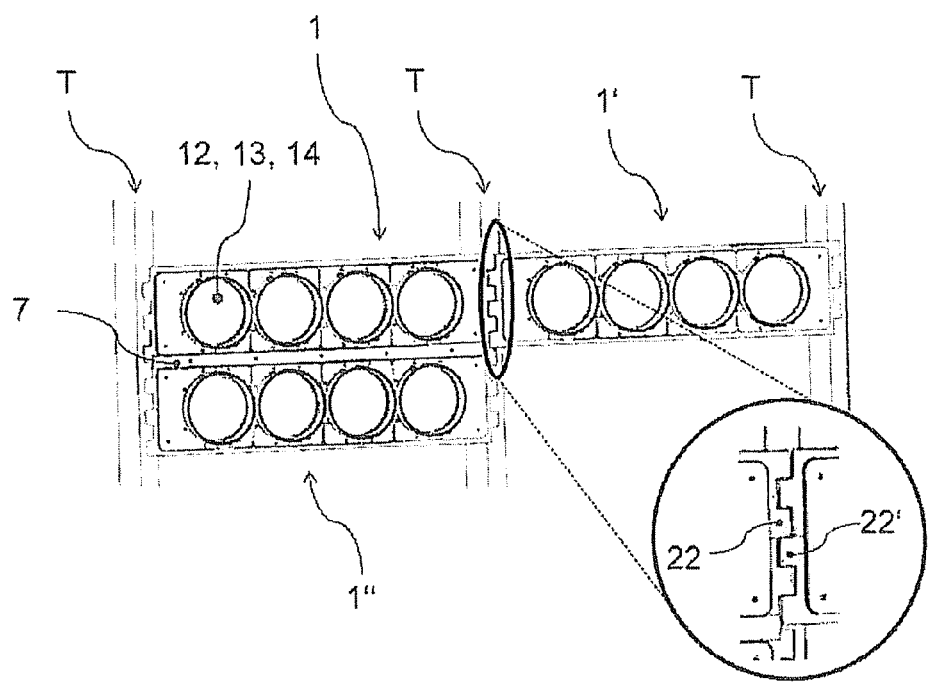
FIG. 3 shows a combination of three assembled modular frames.

Further, the modular frame comprises along the shorter exterior edges an edge contour 22 in the form of three square recesses, alternatingly arranged at each side. The recesses forming the edge contour 22 are arranged such that on the opposite side a recess is located and is faced by a square projection formed by two adjacent recesses. These elements, as shown in FIG. 3, may engage when, for example, two modular frames are mounted side-by-side and thus form a guidance for the simple positioning and assembly of the modular frame. The longer exterior edges show no edge contour.

The intermediate element 3 is embodied in the exemplary embodiment shown in FIG. 1 as a separate element, not fixed at the flange elements 4. It is made from felt, for example, and similar to the base plate 2, shows two parts with the division also occurring here along the long central line $M_L$. The intermediate element shows here four semicircular recesses 13, which are arranged at equal distances from each other and when the two halves are joined in an abutting fashion, as occurring in the assembly of the modular frame 1, they form two circular recesses 13 to pass conduits (not shown). Similar to the base plate 2, the distance of the two exterior recesses 13 from the short edge is greater than the distance between the adjacent recesses 13 themselves. The circumference of the rectangle formed by the intermediate element 3 is slightly smaller than the circumference of the rectangle formed by the base plate 2. Here, the circumference of the rectangle formed by the intermediate element 3 is equivalent to the circumference of the rectangle formed by the flange elements 4.

The diameter of the passages 13 of the intermediate element is equivalent to the diameter of the passages 12 of the base plate 2.

The two-part flange elements 4 comprise a flange area 34 and a sheath area 24 welded thereto. Here, the flange area 34 contacts the intermediate element 3, which in turn contacts the base plate 2 and the flange elements 4. As shown in FIG. 1, four flange elements are arranged in a row such that in the assembled state a modular frame develops with four passages embodied congruent in reference to each other. The flange area 34 of the two central flange elements 4 is square, while the flange areas 43 of the two outer flange elements 4 are rectangular.

Inside the sheath area 24 two semicircular sealing elements are arranged each, e.g., per flange element, which for example are made from intumescent material such that they completely cover the sheath area 24 forming the passage 14. When combining the two halves of the flange elements 4 the sealing elements 5 also show a circular passage. The sealing elements are embodied such that they surround a conduit (not shown) in a smoke gas-sealed fashion. In order to fix the conduit (not shown) threaded bores 54 are provided at one half of the flange elements 4 each in the sheath area 24, through which bolts may be guided. Preferably the threaded bores 54 are arranged opposite each other.

Two semicircular sealing element strips 5 are arranged at the inside of the sheath areas Y of a flange element 4 contacting the sheath area.

The sheath area Y of the flange elements 4 here comprises a structure 14 to fix a conduit (not shown in the figure), with one half each of the two-part flange elements 4 is provided with structure 14 so that the structure 14 are arranged opposite each other.

Figure 2:
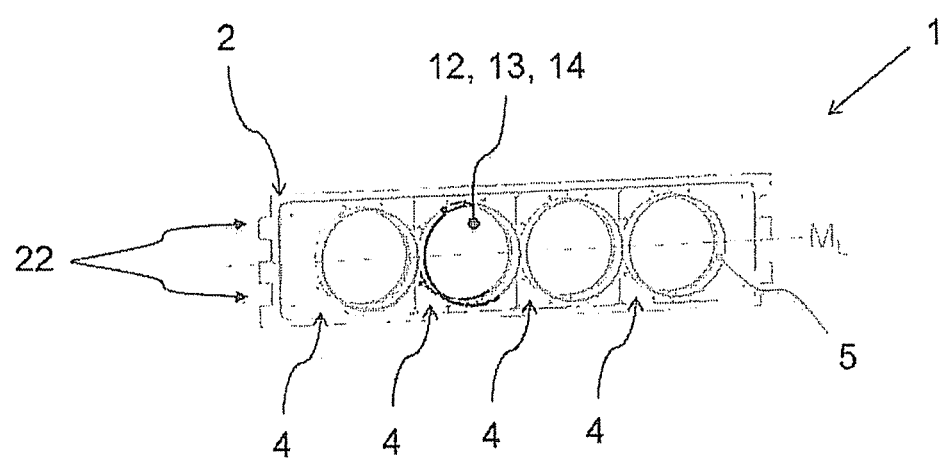
FIG. 2 shows the modular frame shown in FIG. 1 in the assembled state.

FIG. 2 shows the modular frame 1 of FIG. 1 in the assembled form. The two passages 12, 13 and the passage 14 show the same size and are located congruently in reference to each other. Further, the flange elements 4 are positioned congruently on the intermediate element (3), which therefore is no longer visible in FIG. 2. The edge contours 22 at the shorter exterior edges behave positive and negative in reference to each other when the edge contours are mirrored along the longer central line ML, dividing the shorter central line (not shown).

FIG. 3 shows an arrangement of three modular frames 1, 1', and 1" with four passages (12, 13, 14) each, with two modular frames 1 and 1' arranged in a row and a third one 1" arranged underneath the left modular frame 1. The width of the modular frame 1, 1', 1" is selected such that it may be fastened to the carriers T of a drywall. In the modular frames arranged in a row the edge contours 22 and 22' engage each other as discernible from the enlarged detail. The modular frames 1 and 1 arranged on top of each other at the carrier T are also additionally fixed to each other by an element 7.

Adjacent to the modular frames 1, 1', and 1" appropriate drywall sections may be placed, which perhaps may need to be appropriately cut such that the three modular frames 1, 1', and 1" are completely enclosed by the drywall. Alternatively, the drywall sheets may be mounted directly on the modular frames 1, 1', and 1" so that they are covered completely. This might be desirable when it is not yet determined how many conduits are planned and at what location. In this case the drywall then has to be cut out at the respective position.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A modular frame to assemble a plurality of conduits at a construction part, said modular frame comprising:
   a base plate configured to be fastened at a construction part, the base plate defining a plurality of conduit openings, each conduit opening being sized to accept a conduit;
   a plurality of flange elements arranged side-by-side and being configured to be connected to the base plate, each flange element defining a conduit opening that aligns with a respective conduit opening on the base plate when the flange element is connected to the base plate, at least one of said plurality of flange elements comprising a sealing element; and
   a flat, plate-shaped intermediate element disposed between the base plate and the flange elements, the intermediate element defining a plurality of conduit openings that align with respective conduit openings in the base plate and are sized to accept a conduit.

2. The modular frame of claim 1 wherein the base plate and the intermediate element are embodied rectangular.

3. The modular frame of claim 1 wherein several passages are arranged at even distances from each other along a long central line ($M_L$).

4. The modular frame of claim 1 wherein the base plate and the intermediate element are embodied in two parts.

5. The modular frame of claim 4 wherein the base plate and the intermediate element are divided into two parts along a central line symmetrically dividing the two short sides with the passages forming two semicircular recesses.

6. The modular frame of claim 1 wherein the base plate further comprises an edge contour at least at two opposite exterior edges.

7. The modular frame of claim 1 wherein the edge contour provided at opposite exterior edges is embodied such that when abutting several devices the edge contours of two adjacent devices engage each other.

8. The modular frame of claim 6 wherein the flange elements are embodied in two parts.

9. The modular frame of claim 1 wherein the flange elements each show a passage to accept the sheath area forming the conduit and a planar flange area, with the sealing element being arranged in the sheath area.

10. The modular frame of claim 7 wherein the sheath area and the flange area are divided along the central line of the flange area into two equal parts with the sheath area forming two semicircles.

11. The modular frame of claim 1 wherein the flange elements further comprise a structure to fix the conduit.

12. The modular frame of claim 1 wherein the sealing element comprises a material intumescent in case of fire.

13. The modular frame of claim 1 wherein the base plate and the flange element are made from metal.

14. The modular frame of claim 1 wherein the passages of the intermediate element are smaller than the passages of the base plate and the passage of the flange element, which are of substantially equal size.

15. The modular frame of claim 1 wherein the intermediate element comprises a non-combustible, thermally insulating material.

\* \* \* \* \*